(No Model.)

J. P. RUTH.
AXLE LUBRICATOR.

No. 366,131.

Patented July 5, 1887.

WITNESSES:
Donn Twitchell
Ca Sedgwick

INVENTOR:
J. P. Ruth
BY Munn & Co.
ATTORNEYS.

United States Patent Office.

JAMES POLK RUTH, OF WEST ALEXANDER, PENNSYLVANIA.

AXLE-LUBRICATOR.

SPECIFICATION forming part of Letters Patent No. 366,131, dated July 5, 1887.

Application filed February 12, 1887. Serial No. 227,366. (No model.)

*To all whom it may concern:*

Be it known that I, JAMES POLK RUTH, of West Alexander, in the county of Washington and State of Pennsylvania, have invented a new and Improved Vehicle-Lubricator, of which the following is a full, clear, and exact description.

This invention relates to a novel form of lubricator that is applicable for use in connection with the wheels of most any vehicle, the object of the invention being to overcome the necessity of removing the wheels in order that the lubricating material may be applied.

Reference is to be had to the accompanying drawings, forming a part of this specification, in which similar figures of reference indicate corresponding parts in all the views.

Figure 1:
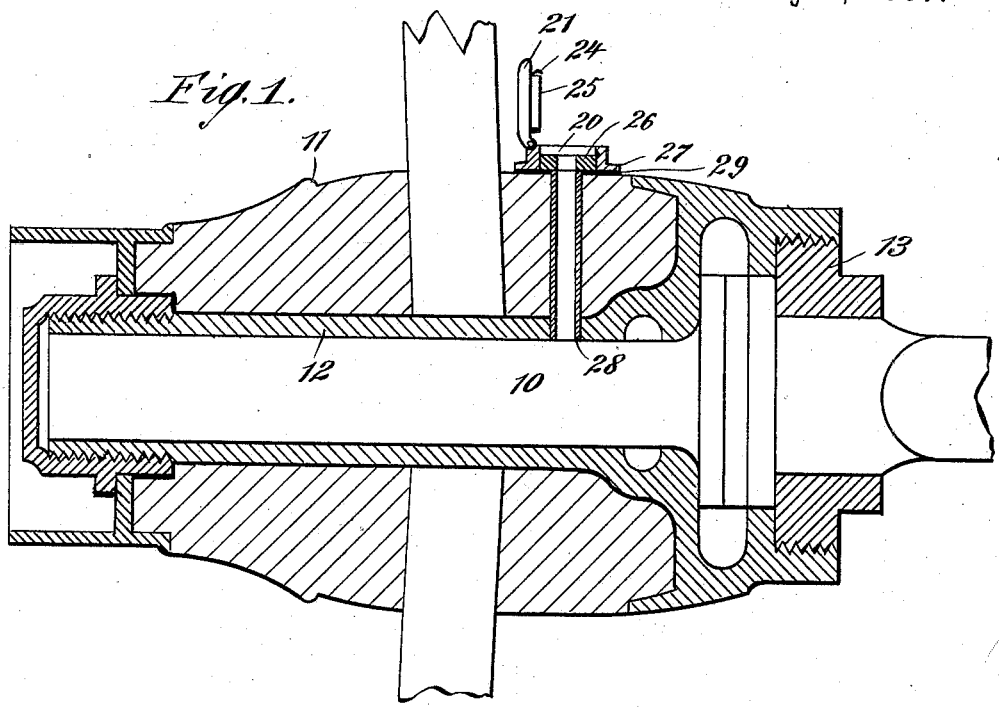
Figure 2:
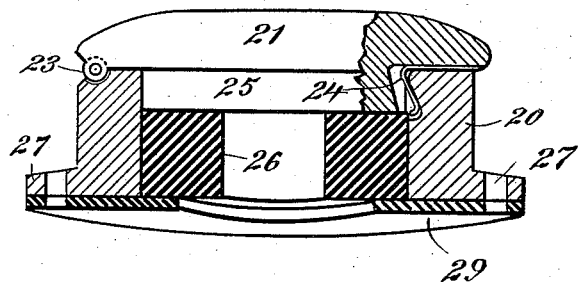
Figure 3:
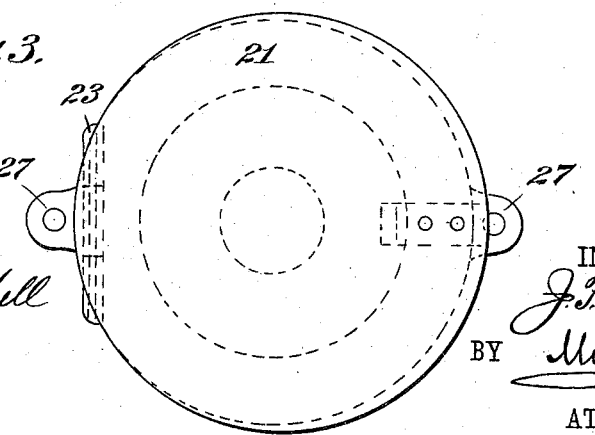

Figure 1 is a central longitudinal sectional view of a hub provided with my improved form of lubricator, which lubricator is also shown in central section. Fig. 2 is a central sectional view of the lubricator as it appears when removed from the vehicle-wheel, the view being, however, given upon an enlarged scale in order to more clearly represent the construction and arrangement of the parts; and Fig. 3 is a plan view of the lubricator.

In the drawings above referred to, 10 represents the axle, 11 the wooden portion of the hub, and 12 the metallic portion or box of an ordinary vehicle-wheel; and, as represented in the drawings, the wheel is held to place by an inner retaining-nut, 13.

The lubricator proper consists of a box-like structure, 20, that is provided with a cover, 21, hinged to the main body of the structure at 23, the cover being arranged to be clamped to place by a spring, 24. This cover 21 is formed with a downwardly-extending central projection, 25, which, when the cover is closed, as represented in Fig. 2, is seated upon a rubber cushion, 26. Lugs 27, formed with central apertures, extend outward from the main body of the lubricator.

In applying my improved form of lubricator I make a hole through the wooden and metallic portions of the hub, and line this hole or aperture with a tube, as 28. I then place a rubber washer, 29, about the upper end of the tube and seat the lubricator upon this washer. The lubricant is then poured in through the central opening in the cushion 26. Passing thence into the tube 28 it finds its way to the axle and its box, any escape of the lubricant being prevented by turning the cover 21 downward to the position in which it is shown in Fig. 2.

With such a device as the one above described the necessity of removing vehicle-wheels in order to lubricate the axles is entirely avoided. Thereby a material saving of time and labor is effected, as will be readily appreciated by those who have had occasion to lubricate or grease the ordinary form of vehicle-wheel.

Having thus fully described my invention, I claim as new and desire to secure by Letters Patent—

The combination, with a vehicle-wheel, of a box-like structure, 20, a rubber washer interposed between the box-like structure and the outer face of the hub of the vehicle-wheel, a cover, 21, a cushion, 26, and connections between the bore of the cushion and the box of the hub, substantially as described.

JAMES POLK RUTH.

Witnesses:
ISAAC Y. HAMILTON,
L. M. MARSH.